United States Patent
Kim et al.

(10) Patent No.: US 10,366,499 B2
(45) Date of Patent: Jul. 30, 2019

(54) DEVICE, METHOD, AND COMPUTER-READABLE RECORDING MEDIUM FOR EDITING AND PLAYING ROBOT MOTION

(71) Applicant: ROBOTIS CO., LTD., Seoul (KR)

(72) Inventors: Byoung Soo Kim, Seoul (KR); Jin Sung Kim, Seoul (KR); In Yong Ha, Seoul (KR)

(73) Assignee: ROBOTIS CO., LTD., Seoul (KR)

( * ) Notice: Subject to any disclaimer, the term of this patent is extended or adjusted under 35 U.S.C. 154(b) by 218 days.

(21) Appl. No.: 15/273,722

(22) Filed: Sep. 23, 2016

(65) Prior Publication Data
US 2018/0089787 A1    Mar. 29, 2018

(51) Int. Cl.
| | | |
|---|---|---|
| G06K 9/00 | (2006.01) | |
| G06T 7/20 | (2017.01) | |
| B25J 9/16 | (2006.01) | |
| G06T 7/246 | (2017.01) | |

(52) U.S. Cl.
CPC ............ *G06T 7/2033* (2013.01); *B25J 9/1671* (2013.01); *G06T 7/246* (2017.01); *G05B 2219/45007* (2013.01)

(58) Field of Classification Search
None
See application file for complete search history.

(56) References Cited

U.S. PATENT DOCUMENTS

| | | | |
|---|---|---|---|
| 5,909,218 A | * | 6/1999 | Naka ..................... G06T 13/40 345/418 |
| 2002/0003540 A1 | | 1/2002 | Unuma et al. |
| 2003/0023347 A1 | * | 1/2003 | Konno .................. B25J 9/1671 700/245 |
| 2003/0034979 A1 | | 2/2003 | Nakamura et al. |
| 2016/0005228 A1 | * | 1/2016 | Niebla, Jr. ........... H04N 13/122 348/43 |
| 2017/0085863 A1 | * | 3/2017 | Lopez ................. H04N 13/261 |

FOREIGN PATENT DOCUMENTS

| | | |
|---|---|---|
| JP | 2001-188918 A | 7/2001 |
| JP | 2004-130428 A | 4/2004 |
| JP | 2005-071182 | 3/2005 |
| KR | 10-2003-0014164 A | 2/2003 |

* cited by examiner

*Primary Examiner* — Atiba O Fitzpatrick
(74) *Attorney, Agent, or Firm* — Revolution IP, PLLC (57) ABSTRACT

A device for editing and playing a robot motion comprises: a storage configured to store a 3D image file of a robot and further store time-dependent stationary postures of the robot edited by a user input in units of key frames; and a robot motion viewer configured to display, as a video, motion units of the robot obtained by connecting the stationary postures stored in units of key frames using an interpolation technique.

11 Claims, 8 Drawing Sheets

DEVICE, METHOD, AND COMPUTER-READABLE RECORDING MEDIUM FOR EDITING AND PLAYING ROBOT MOTION

TECHNICAL FIELD

The present invention relates to a device, method, and computer-readable recording medium for editing and playing a robot motion, and more particularly, to a device, method, and computer-readable recording medium for connecting stationary postures of a robot edited by a user input to edit a motion of the robot.

BACKGROUND ART

Recently, along with the development in the art of robot technology, robots are being used in various industries, and there is an increased need to easily edit motions of robots.

However, conventionally, when a motion of a robot is edited, an actual robot model needs to be directly driven in order to edit the motion. Thus, the editing of the motion of the robot is possible only when an actual robot model is connected with a terminal such as a personal computer (PC). Also, the actual robot model may fall down when the motion of the robot stops while the robot's center of mass is in an unstable state.

Accordingly, there is a need for a solution that allows editing a motion of a robot in consideration of an end action upon the execution of the robot motion and also allows editing the motion of the robot intuitively and easily without having to drive an actual robot model.

DISCLOSURE

Technical Problem

The present disclosure is directed to providing a robot motion editing and playing device that may connect stationary postures of a robot edited by a user input to edit motions of the robot.

The present invention is not limited to the above objectives, but other objectives may be clearly understood by those skilled in the art from the following descriptions.

Technical Solution

According to an embodiment of the present invention, there is provided a device for editing and playing a robot motion, the device including a storage configured to store a 3D image file of a robot and further store time-dependent stationary postures of the robot edited by a user input in units of key frames and a robot motion viewer configured to display, as a video, motion units of the robot obtained by connecting the stationary postures stored in units of key frames using an interpolation technique.

The storage may further store an identity (ID) allocated to each of joints between a plurality of components constituting the robot, and the robot motion viewer may display the ID allocated to the joint in addition to a 3D image of the robot to edit each of the stationary postures of the robot.

When at least one joint is selected from among joints of a plurality of components constituting the robot, the robot motion viewer may further display an angle change interface for editing an angle of the joint, and the storage may store a stationary posture of the robot including a component having a joint edited according to an angle input through the angle change interface.

The robot motion viewer may further display a timeline interface for registering the time-dependent stationary postures of the robot, and the storage may store the stationary postures of the robot in units of key frames according to a time input through the timeline interface.

The robot motion viewer may further display a motion unit parameter interface for editing inertial force of the robot and flexibility of at least one of joints between a plurality of components constituting the robot and may display the motion units as a video using a motion unit parameter input through the motion unit parameter interface.

The robot motion viewer may further display a flowchart interface for registering the motion units in sequence and may display, as a video, motions obtained by connecting the motion units in an order in which the motion units are input through the flowchart interface.

The robot motion viewer may further display a motion unit parameter interface for editing a play speed, a repetition number, and a call possibility of each of the motion units, and the robot motion viewer may display the motion as a video using a motion parameter input through the motion parameter interface.

The storage may store an end motion unit that has a center of mass connected with each of the motion units input through the flowchart interface in a stable state, and the robot motion viewer may successively display the end motion unit when an end command is input while the video of the motion is being displayed.

The 3D image file of the robot may include at least one of a file that is provided, by default, by a motion unit editing program executed by the robot motion viewer and a file that is edited and stored through a robot assembling program by a user's manipulation.

The storage may store the motion units obtained by connecting the stationary postures by referencing the stationary postures by a library method and may store the motion obtained by connecting the motion units by referencing the motion units by a library method.

The storage may store, in one motion project file, motion groups obtained by grouping motions obtained by connecting the motion units according to purpose.

According to another embodiment of the present invention, there is provided a method of editing and playing a robot motion, the method including storing a 3D image file of a robot and further storing time-dependent stationary postures of the robot edited by a user input in units of key frames; and displaying, as a video, motion units of the robot obtained by connecting the stationary postures stored in units of key frames using an interpolation technique.

According to still another embodiment of the present invention, there is provided a computer-readable recording medium for recording a computer program for executing the method.

Advantageous Effects

According to an embodiment of the present invention, since a timeline-based animation editing technology is used to edit a motion unit of a robot, it is possible to provide an intuitive motion unit editing environment, compared to the conventional way, thereby allowing even non-specialists to intuitively edit the motion unit of the robot and thus improving user convenience.

Also, according to an embodiment of the present invention, when the motion unit of the robot is edited, a result of the editing may be checked in advance through the motion of the robot displayed on the screen window, without directly driving the actual robot model.

Also, according to an embodiment of the present invention, when the motion of the robot is executed, it is possible to prevent an accident associated with ending because an end motion unit in which the robot has a center of mass being in a stable state is stored and successively displayed at the end.

Also, according to an embodiment of the present invention, it is possible to store and manage the motion of the robot, thus increasing a reuse rate of the motion of the robot and facilitating maintenance of the motion of the robot.

The effects of the present invention are not limited to the above and should be understood as including all effects that can be inferred from a configuration of the present invention described in the detailed description and claims of the present invention.

MODES OF THE INVENTION

Hereinafter, the present invention will be described with reference to the accompanying drawings. The present invention may, however, be embodied in many different forms and should not be construed as being limited to the embodiments set forth herein. In the accompanying drawings, portions irrelevant to a description of the exemplary embodiments will be omitted for clarity. Moreover, like reference numerals refer to like elements throughout.

In this disclosure below, when one part (or element, device, etc.) is referred to as being "connected" to another part (or element, device, etc.), it should be understood that the former can be "directly connected" to the latter, or "indirectly connected" to the latter via an intervening part (or element, device, etc.). Furthermore, when one part is referred to as "comprising (or including or having)" other elements, it should be understood that it can comprise (or include or have) only those elements, or other elements as well as those elements unless specifically described otherwise.

Hereinafter, embodiments of the present invention will be described in detail with reference to the accompanying drawings.

Figure 1:
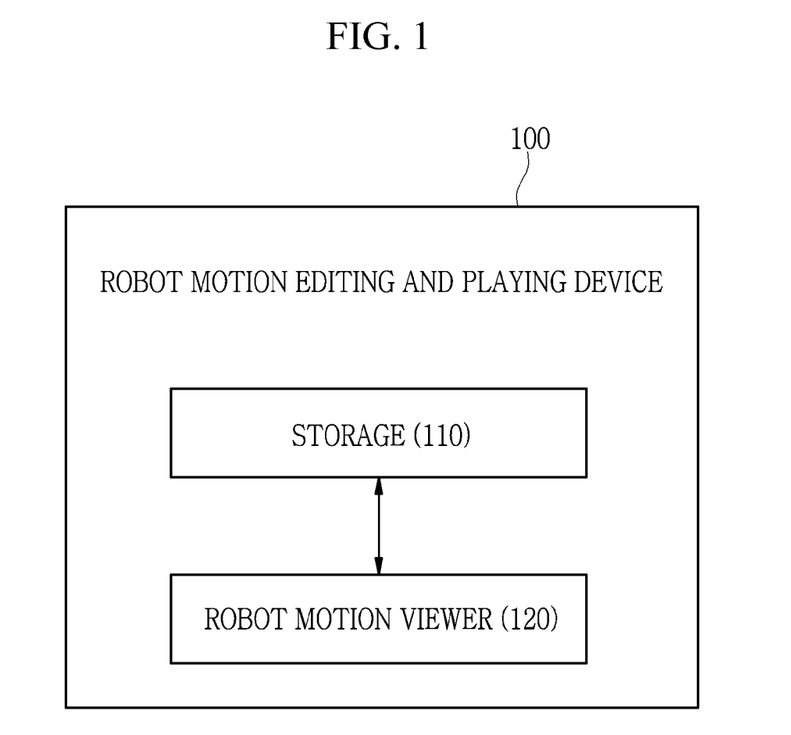
FIG. 1 is a block diagram showing a configuration of a device for editing and playing a robot motion according to an embodiment of the present invention.

FIG. 1 is a block diagram showing a configuration of a device for editing and playing a robot motion according to an embodiment of the present invention.

Referring to FIG. 1, a robot motion editing and playing device 100 may include a storage 110 and a robot motion viewer 120.

The storage 110 may be configured as a memory of the robot motion editing and playing device 100 including a program memory, a data memory, etc.

The program memory may store execution programs executed by the robot motion viewer 120. For example, the storage 110 may store a robot assembling program for editing 3D images of a robot, a motion unit editing program for editing motion units of the robot, a motion editing program for editing motions obtained by connecting the motion units, etc.

The data memory may store data generated while the programs stored in the program memory are being executed by the robot motion viewer 120. For example, the storage 110 may store a 3D image of a robot generated through the robot assembling program, store a motion unit generated through the motion unit editing program, and store a motion generated through the motion editing program.

The storage 110 may store 3D image files of various components of the robot. That is, the storage 110 may store a 3D image file of each of the components constituting the robot and may store a 3D image file of a portion or the entirety of a robot composed of a plurality of components. In this case, the storage 110 may store identities (IDs) allocated to joints between the plurality of components constituting the robot, in addition to the 3D images of the components.

The storage 110 may store angles of the joints between the plurality of components constituting the robot and may store a stationary posture of the robot composed of components corresponding to joints edited to correspond to the angles. In this case, a setting of a degree to which the angle of the joint is changed may be edited through an angle change interface provided by the robot motion viewer 120 to be described below.

The storage 110 may store time-dependent stationary postures of the robot in units of key frames. Here, a key frame is a frame that displays an important movement and position in a motion unit of the robot. For example, when the motion unit of the robot is a motion unit for sitting down and standing up, the movement and position of a robot that is sitting down and the movement and position of a robot that is standing up may each be a key frame. That is, the storage 110 may store a stationary posture of the robot (e.g., a stationary posture of a robot that is sitting down, a stationary posture of a robot that is standing up, etc.) corresponding to a specific time point in units of key frames among the motion units of the robot, and the stationary posture of the robot stored in units of key frames may be edited by changing the angles of the joints between the plurality of components constituting the robot. In this case, a setting of a time point at which the stationary posture of the robot is displayed may be edited through a timeline interface provided by the robot motion viewer 120 to be described below.

The storage 110 may store a motion unit of the robot that connects stationary postures of the robot according to an interpolation technique. Here, the interpolation technique may be a method for smoothly and naturally connecting, over time, the stationary postures of the robot stored in the storage 110 in units of key frames. For example, the storage 110 may store a first stationary posture at a time point of 0 sec, in which the robot is sitting down, and a second stationary posture at a time point of 1 sec, in which the robot is standing up. The storage 110 may store a motion unit of the robot in which the first stationary posture and the second stationary posture are connected according to the interpolation technique, that is, a motion unit of the robot in which the robot that was sitting down naturally stands up as time passes from 0 to 1 sec. In this case, the motion unit of the robot may be generated by the robot motion viewer 120 to be described below and may be displayed as a video on a screen window.

The storage 110 may store a motion unit parameter including at least one of inertial force of the robot and flexibility for the joints between the plurality of components constituting the robot. Here, the motion unit parameter may be edited by a user input. A setting of a flexibility level of an operation of a motion unit that changes the joints between the components and an inertial force level, which is a speed limit level at the start and end of the operation, may be edited through a motion unit parameter interface provided by the robot motion viewer 120 to be described below.

The storage 110 may store a motion that sequentially connects motion units of the robot. In this case, a setting of the order of motion units may be edited through a flowchart interface provided by the robot motion viewer 120 to be described below.

The storage 110 may store a motion parameter including at least one of a repetition number, a play speed, and a call possibility of the motion unit of the robot. Here, the motion parameter may be edited by a user input. A setting of how many times the motion unit of the robot is repeated, what the play speed is, and whether the motion unit is to be played first may be edited through a motion parameter interface that provides the robot motion viewer 120 to be described below.

The storage 110 may store an end motion unit connected with the motion unit included the motion. Here, the end motion unit may be edited and registered by a user input or may be randomly registered by the robot motion editing and playing device 100.

Also, the end motion unit may be stored as a posture in which the robot has a center of mass being in a stable state, for example, a posture in which the robot stands upright on two legs or lies down. Here, the stable state may refer to a state in which the robot does not collapse or fall down since the center of gravity is in equilibrium, not biased in any direction.

That is, while separately storing a 3D image of the robot, the storage 110 may store stationary posture information including angles of the joints between the components constituting the robot, store motion unit information including information regarding a time point at which the stationary postures are connected and motion unit information including a motion unit parameter that is applied upon the operation, and store link information through which motion units are connected, motion parameters applied during the operation, and motion information which includes whether the end motion is connected.

Stationary posture information, motion unit information, and motion information are separately stored. Thus, the information may be referenced by a library method and used when a stationary posture or a motion unit is recycled and reused. Thus, the stationary posture or the motion unit may be stored only once.

For example, a first stationary posture, a second stationary posture, and a third stationary posture each has a memory capacity of 64 bytes. When a first motion unit including the first stationary posture and the second stationary posture and a second motion unit including the first stationary posture and the third stationary posture are stored in the memory, the first motion unit and the second motion unit have a memory capacity of 123 bytes. Accordingly, a total memory capacity of 256 bytes is needed. In this case, when the storage 110 stores the first stationary posture, the second stationary posture, and the third stationary posture, and the first motion unit or the second motion unit is needed, the stored stationary postures may be referenced by a library method and loaded. Accordingly, when the first motion unit and the second motion unit are stored in the memory, the storage may be performed using the total memory capacity of the first stationary posture, the second stationary posture, and the third stationary posture, that is, 192 bytes. Likewise, for a motion obtained by connecting motion units, a motion unit or a stationary posture is stored only once when the motion unit or the stationary posture is repeated.

As described above, according to an embodiment of the present invention, a motion unit included in a motion or a stationary posture included in a motion unit can be stored only once when the motion unit or the stationary posture is repeated, thus reducing the use of memory.

The robot motion viewer 120 may display various kinds of information on a screen widow provided through a specific program. In this case, the robot motion viewer 120 may display the information through one or more screen windows. When the information is displayed through a plurality of screen windows, the robot motion viewer 120 may display the information that is divided or overlapped for each of the screen windows.

The robot motion viewer 120 may display, on a screen window, 3D image files of various elements of the robot stored in the storage 110. In this case, the robot motion viewer 120 may separately display 3D images of the elements on the screen window or may display a 3D image of a portion or the entirety of the robot composed of the elements.

When a screen change command (e.g., movement, enlargement, reduction, etc.) is input according to a user's manipulation while the robot motion viewer 120 displays the 3D image of the robot, the robot motion viewer 120 may further display, on the screen window, a 3D image of the robot that is changed according to the screen change command.

The robot motion viewer 120 may display identities (IDs) allocated to joints between a plurality of components constituting the robot on the screen window, together with 3D images of the components.

When one or more joints are selected from among the joints between the plurality of components by a user input (e.g., a selection of a 3D component image, a selection of an ID allocated to a joint between components, etc.), the robot motion viewer 120 may provide an angle change interface for editing an angle of the selected joint to display the provided angle change interface on the screen window. Here, the angle change interface is a user interface for setting a degree to which an angle of a joint will be changed. The robot motion viewer 120 may change the angle of the selected joint to an angle input through the angle change interface and display, on the screen window, a 3D image of the robot that includes a component corresponding to the joint having the changed angle.

The robot motion viewer 120 may provide a timeline interface for registering a time-dependent stationary posture of the robot to display the provided timeline interface on the screen window. Here, the timeline interface is a user interface for setting the time-dependent stationary posture of the robot to be positioned in units of key frames and played at a corresponding time. The storage 110 may store the stationary postures of the robot in units of key frames according to an input time point through the time line interface.

The robot motion viewer 120 may connect the stationary postures of the robot positioned in units of key frames according to an interpolation technique to generate a motion unit of the robot and may display the generated motion unit of the robot on a screen window as a video. In this case, the storage 110 may store the motion unit of the robot generated by the robot motion viewer 120.

For example, when a first stationary posture is a state in which an arm of the robot is raised by changing an angle of a joint of the arm through the angle change interface and a second stationary posture is a state in which the arm of the robot is lowered, the robot motion viewer 120 may connect the first stationary posture and the second stationary posture according to an interpolation technique to generate a motion unit of the robot in which the robot naturally lowers the arm and display the motion unit of the robot on the screen window as a video. Here, a time at which the first stationary posture is played is earlier than a time point at which the second stationary posture is played. For example, the first stationary posture is a key frame that is played at a time point of 1 sec after the start, and the second stationary posture is a key frame that is played at a time point of 2 sec after the start.

When the first stationary posture and the second stationary posture are connected, the robot motion viewer 120 may generate the motion unit of the robot according to a time interval between key frames. The robot motion viewer 120 may generate a motion unit of the robot in which the first stationary posture slowly changes to the second stationary posture when the time interval is long and may generate a motion unit of the robot in which the first stationary posture quickly changes to the second stationary posture when the time interval is short.

For example, as described above, the robot motion viewer 120 connects the first stationary posture and the second stationary posture according to an interpolation technique to generate a motion unit of the robot in which the robot with an arm raised naturally lowers the arm. The robot motion viewer 120 may generate a motion unit of the robot in which the arm is lowered for 2 sec when a time interval between the first stationary posture and the second stationary posture is 2 sec and may generate a motion unit of the robot in which the arm is lowered for 1 sec when a time interval between the first stationary posture and the second stationary posture is 1 sec. Accordingly, the motion of the robot in which the arm is lowered for 1 sec moves faster than the motion of the robot in which the arm is lowered for 2 sec. Thus, the robot motion viewer 120 may generate the motion unit of the robot according to a time interval between the stationary postures, that is, according to an interval between the key frames and may display the motion unit of the robot on the screen window as a video.

The robot motion viewer 120 may provide a flowchart interface for sequentially registering motion units of the robot to display the flowchart interface on the screen window. Here, the flowchart interface is a user interface for sequentially positioning the motion units of the robot and generating a continuous motion of the robot. The robot motion viewer 120 may generate a motion obtained by connecting the motion units of the robot and display the motion on the screen window as a video according to a setting of the motion units of the robot that is input through the flowchart interface.

The robot motion viewer 120 may provide a flowchart interface for registering an end motion unit in connection with the motion units of the robot and display the provided flowchart interface on the screen window. Here, the flowchart interface is a user interface for connecting the end motion unit with each of the motion units of the robot. The robot motion viewer 120 may register an end motion unit connected with the motion unit of the robot that is input through the flowchart interface and display the end motion unit at the end. In this case, the end motion unit may be a motion unit of the robot having a center of mass being in a stable state.

When a play end command is input by a user's manipulation while a motion of the robot is being displayed on the screen window as a video, the robot motion viewer 120 may connect an end motion unit with a part at which the video stops being played and display the end motion unit on the screen window.

For example, the robot motion viewer 120 may connect a first motion unit, a second motion unit, and a third motion unit to generate a motion and display the motion on the screen window as a video. In this case, an end motion unit connected with the second motion unit may be preregistered.

When the motion is displayed as a video, the robot motion viewer 120 may sequentially display the first motion unit, the second motion unit, and the third motion unit. When a pause command is input by a user's manipulation while the video is not connected with an actual robot model, the video may temporarily stop being played. Subsequently, when a play command is input by a user's manipulation while the video is paused, the robot motion viewer 120 may resume playing the paused video from the stopped part and display the video on the screen window.

The robot motion viewer 120 may display the second motion unit after displaying the first motion unit. When an end command is input by a user's manipulation, the robot motion viewer 120 may connect an end motion unit with the second motion unit and display the end motion unit. In this case, the robot motion viewer 120 may connect the end motion unit with the second motion unit according to an interpolation technique and display the end motion unit on the screen window such that the end motion unit naturally moves, starting from a part at which the video is stopped. This is to finish playing the motion while executing an arrangement operation such that the robot does not fall down by displaying an end motion unit being in a stable state when the play of the motion ends by a user's request.

According to an embodiment of the present invention, the robot motion viewer 120 may display the second motion unit after displaying the first motion unit. When a compulsory end command is input by a user's manipulation, the robot motion viewer 120 may display only the second motion unit rather than the end motion unit and then end playing of the motion even when the end motion unit connected with the second motion unit is registered.

That is, the robot motion viewer 120 may display a motion unit and then display an end motion unit connected with the motion unit to end playing of the motion due to the end command. Alternatively, the robot motion viewer 120 may display only the motion unit to end playing of the motion by the compulsory end command.

The robot motion viewer 120 may connect continuous operations of the motion unit of the robot to generate a motion using a motion parameter including at least one of a repetition number, a play speed, and a call possibility and may display the motion on the screen window as a video. This will be described below with reference to FIG. 6.

Figure 2:
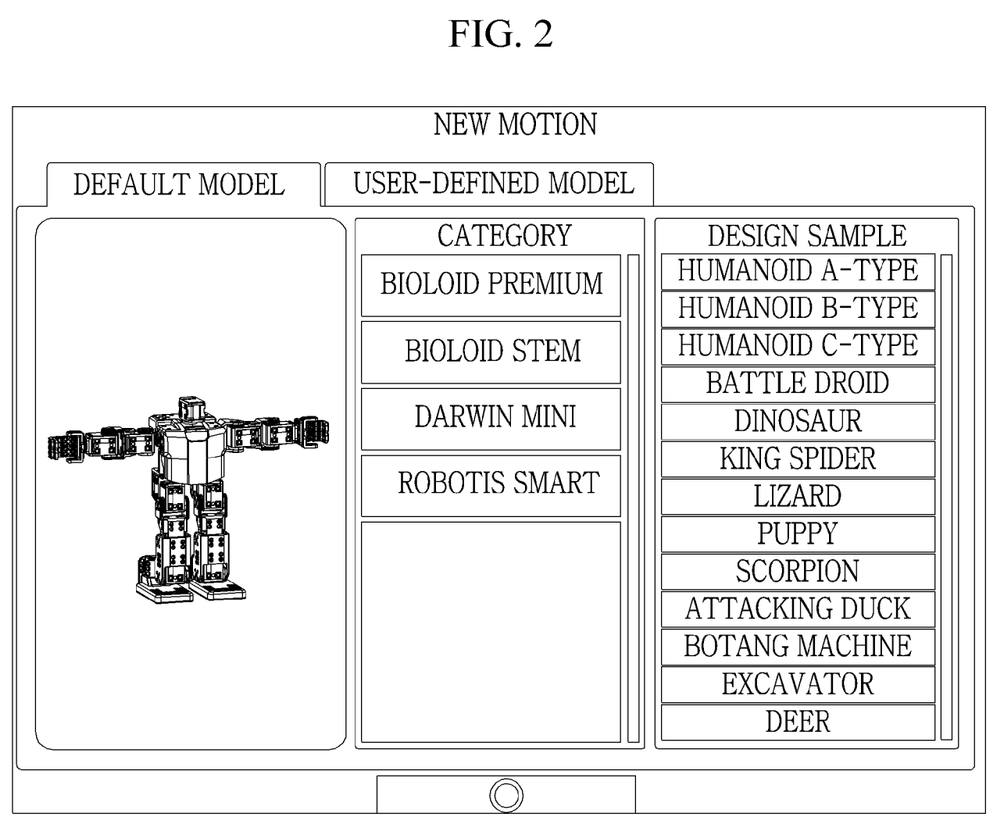
FIG. 2 is a diagram showing a screen window for selecting a robot according to an embodiment of the present invention.

FIG. 2 is a diagram showing a screen window for selecting a robot according to an embodiment of the present invention.

The storage 110 may store information regarding a robot model that is provided, by default, by a robot assembling program for editing a 3D image of the robot or a motion unit editing program for editing the motion unit of the robot.

According to an embodiment of the present invention, the robot motion viewer 120 may execute the motion unit editing program to provide an interface for selecting a default robot model.

In this case, as shown in FIG. 2, the robot motion viewer 120 may provide a robot model list stored in the storage 110. That is, when the robot assembling program or the motion unit editing program is distributed, the default robot model may be selected.

Rather than the above-described default robot model, a robot model that is directly generated by a user may be selected. The robot model information may be generated through the robot assembling program and stored in a memory of the robot motion editing and playing device 100 or a memory of an external device.

In this case, when a robot model generated by a user through the robot assembling program is selected, the robot model information stored in the memory of the robot motion editing and playing device 100 may be loaded to the motion unit editing program, and also the robot model information stored in the memory of the external device connected with the robot motion editing and playing device 100 may be loaded to the motion unit editing program.

Figure 3:
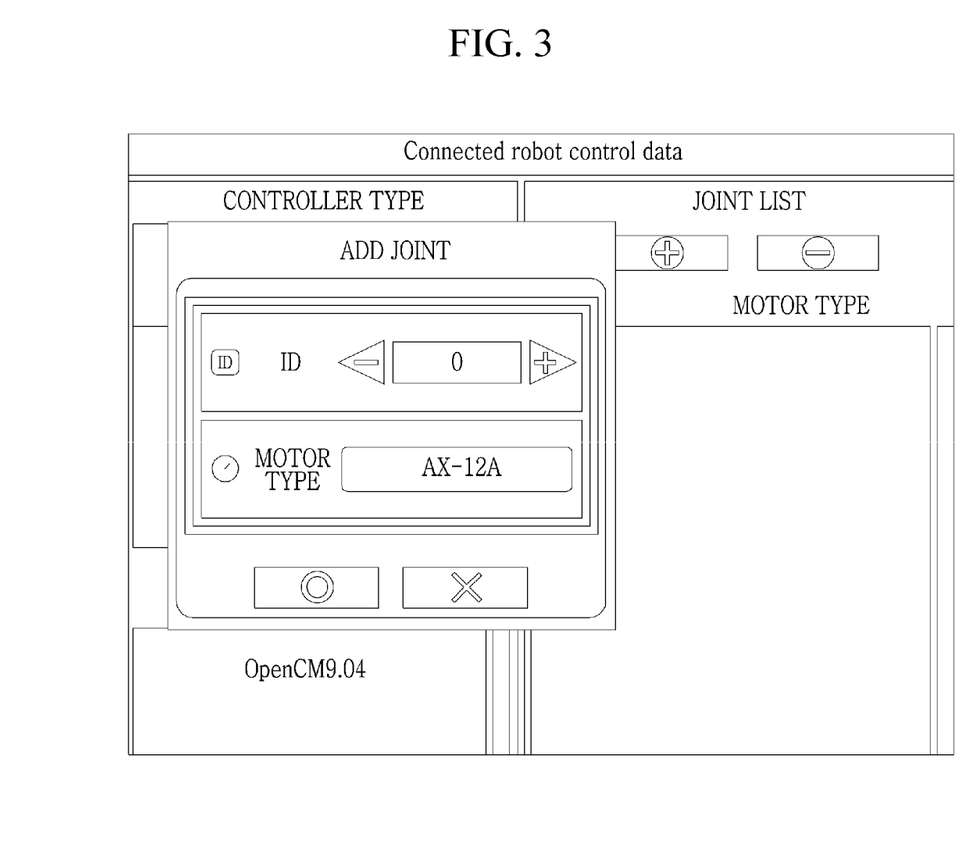
FIG. 3 is a diagram showing a screen window for selecting a robot joint according to an embodiment of the present invention.

The robot motion viewer 120 may display an interface for selecting a joint between parts other than the entire configuration of the robot, for example, components of the robot on the screen window.

As shown in FIG. 3, the robot motion viewer 120 may display an interface for selecting an ID and a motor type allocated to the joint on the screen window to enable the selected joint to be edited. That is, the user may control the entire operation of the robot through the motion unit editing program and may control only an operation of an actuator used for a joint between components constituting the robot.

Figure 4A:
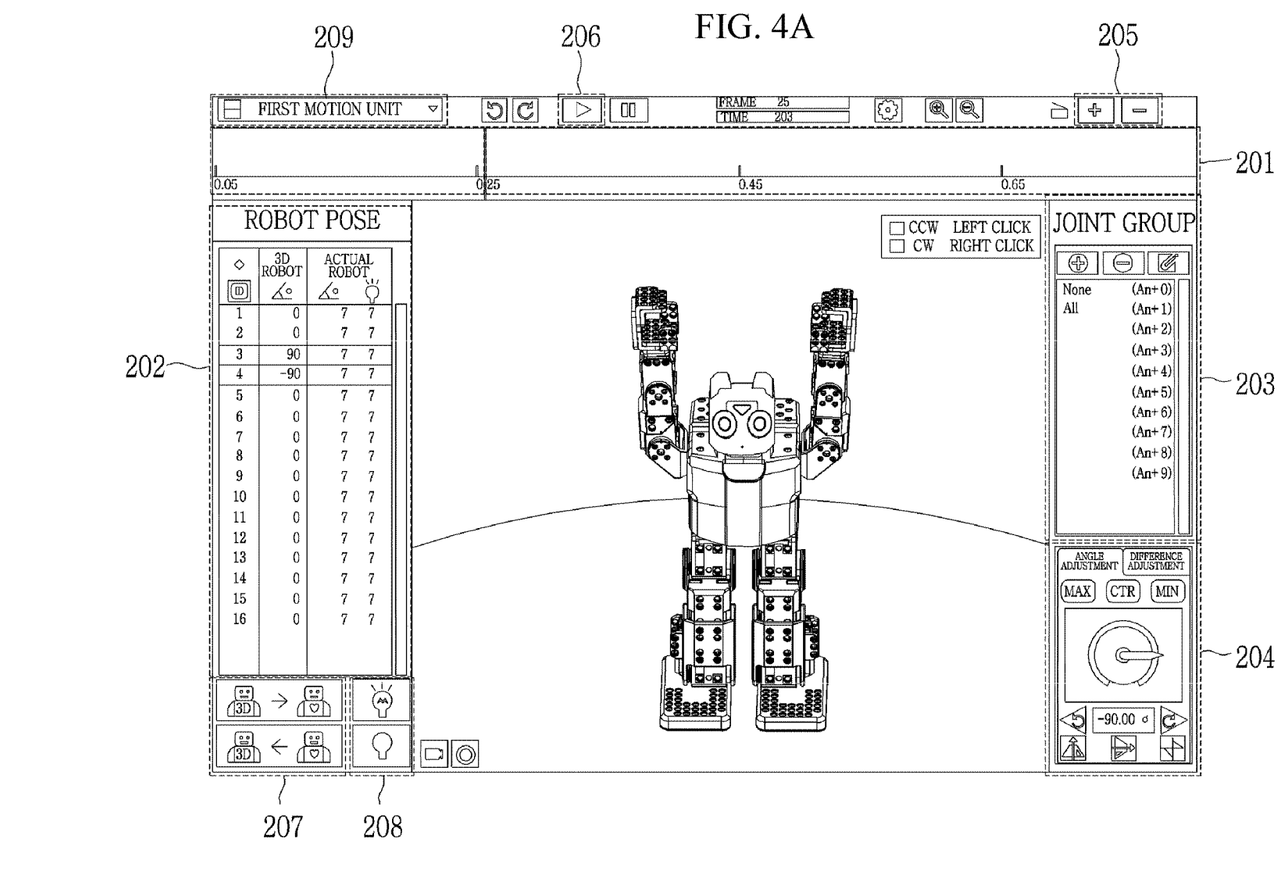
FIG. 4A is a diagram showing a screen window for displaying a first stationary posture of a robot edited by a user input according to an embodiment of the present invention.
Figure 4B:
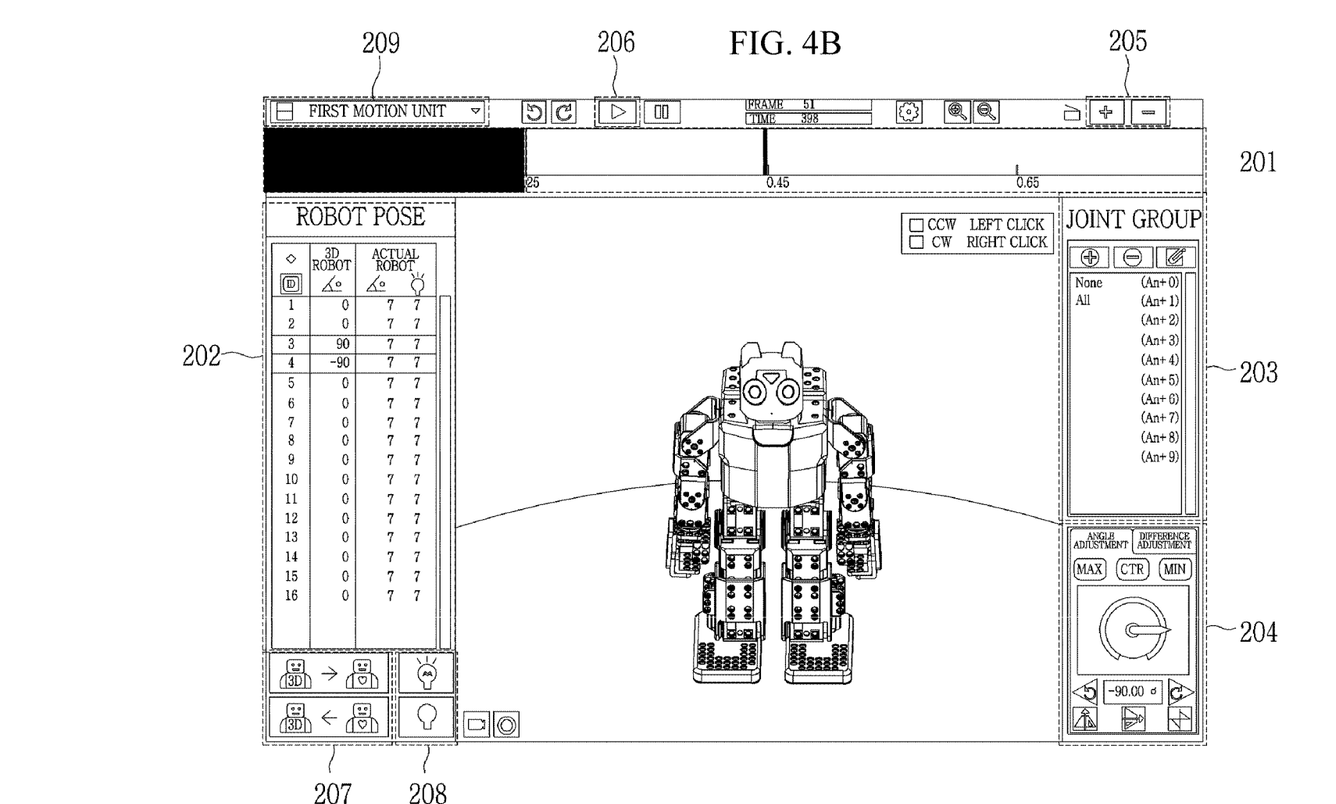
FIG. 4B is a diagram showing a screen window for displaying a second stationary posture of a robot edited by a user input according to an embodiment of the present invention.

FIG. 4A is a diagram showing a screen window for displaying a first stationary posture of a robot edited by a user input according to an embodiment of the present invention, and FIG. 4B is a diagram showing a screen window for displaying a second stationary posture of a robot edited by a user input according to an embodiment of the present invention.

It will be appreciated that although editing the motion unit of the robot will be described below in a process sequence, the sequence may be changed.

First, the storage 110 may store a 3D image file of the robot. Here, the 3D image file of the robot may be a file that is provided, by default, by a motion unit editing program executed by the robot motion viewer 120 or a file that is edited by a user through the robot assembling program and stored in a memory of the robot motion editing and playing device 100 or an external device.

The robot motion viewer 120 may display a robot list on the screen window in the form of a thumb nail for the 3D image of the robot. When any one is selected from the robot list according to a user input, the robot motion viewer 120 may display a 3D image of the selected robot on the screen window.

The storage 110 may store an ID allocated to a joint between components constituting the robot. Here, the ID may be allocated according to a user's manipulation command or may be randomly allocated by the robot motion editing and playing device 100.

The robot motion viewer 120 may display, on the screen window, the 3D image of the robot stored in the storage 110 and the ID allocated to the joint between the components constituting the robot.

Referring to FIGS. 4A and 4B, the robot motion viewer 120 may display a timeline interface 201, a joint list 202, a joint group menu 203, an angle change interface 204, a key frame menu 205, a play menu 206, a teaching menu 207, and a torque menu 208 on the screen window, together with the 3D image of the robot.

The timeline interface 201 is a user interface for setting a stationary posture of a robot edited by a user to be played at a corresponding time by positioning time-dependent stationary postures of the robot in units of key frames. A time point for a stationary posture of the robot that will be edited may be previously positioned through the timeline interface 201 before the stationary posture of the robot is edited. A time point for a stationary posture of the robot that has been edited may be positioned through the timeline interface 201 after the stationary posture of the robot is edited.

The joint list 202 is a menu for selecting one of joints between components constituting the robot. The joint may be individually selected through the joint list 202. When the joint is selected, one or more may be directly selected by a user input from among IDs displayed together with the 3D image of the robot instead of using the joint list 202.

The joint list 202 may include an angle of each joint of the robot displayed as the 3D image and an angle of each joint of an actual robot model. The robot motion viewer 120 may display the joint list 202 on the screen window to show, to the user, an angle of each joint of a 3D robot and an actual robot.

The joint group menu 203 is a menu for selecting a joint group including a plurality of joints. In this case, the group including the plurality of joints may be set by a user input.

For example, as shown in FIGS. 4A and 4B, first to sixteenth IDs are allocated to joints between components of the robot. After a "make a new joint group" button included in the joint group menu 203 is selected, "right arm group" may be input as a joint group name. Subsequently, when a plurality of joints, that is, joints with the third and fifth IDs are selected, and then a confirmation button is selected, the joints with the third and fifth IDs may be set as "right arm group," that is, a joint group.

When "right arm group" is selected through the joint group menu 203, the robot motion viewer 120 may recognize that the joints corresponding to the third and fifth IDs set as "right arm group" are selected and may highlight the selected third and fifth IDs by using, for example, a color different from those of the other IDs.

The joint group menu 203 may include a joint group editing menu, which is a menu for editing the joint group. In this case, the joint group editing menu is a menu for setting a weight for each joint included in the joint group.

For example, joints with the eleventh, thirteenth, and fifteenth IDs are selected as "right leg group." In this case, since the joints with the eleventh, thirteenth, and fifteenth IDs have different angular ranges, each of which may be changed for each position, the weight may be set for each joint through the joint group editing menu, thus preventing interference caused by a movement of the right leg of the robot, that is, an operation due to a change of the joint.

The angle change interface 204 is a user interface for setting a degree to which an angle of each joint selected from the joint list 202 will be changed. The robot motion viewer 120 may change the angle of the selected joint to an angle input through the angle change interface 204 and display, on the screen window, a 3D image of the robot that includes a component whose joint is changed to the angle.

For example, when the third ID is selected through the joint list 202 and an angle of 90 degrees is input through the angle change interface 204, the robot motion viewer 120 may change the angle of the joint corresponding to the third ID to 90 degrees and display a 3D image of the robot including a component whose joint is changed to 90 degrees on the screen window.

When a joint is selected from the joint list 202 or through an ID allocated to the joint, a moving direction may be set according to an input for the joint selection.

According to an embodiment of the present invention, when a joint is selected by clicking a left mouse button through a user input, the selected joint may be set to move in a count clockwise (CCW) direction, that is, (+) direction. When a joint is selected by clicking a right mouse button, the selected joint may be set to move in a clockwise (CW) direction, that is, (−) direction.

For example, when an angle of 45 degrees is input through the angle change interface 204 after the joint with the third ID is selected by a left mouse click and the joint with the fourth ID is selected by a right mouse click, an angle of the joint with the third ID is changed to +45 degrees in a positive direction, and an angle of the joint with the fifth ID is changed to −45 degrees in a negative direction. Thus, a direction in which the joint moves may be set according to a corresponding angle.

The angle change interface 204 may include a difference adjustment tap for changing angles of a plurality of joints selected through the joint list 202 or joints in a joint group selected through the joint list 202 to have the same value. Here, the difference adjustment tap may include a button for selecting an addition or a subtraction and a button for setting a unit value that is changed. In this case, when the button for selecting an addition or subtraction is selected after a unit value (e.g., 0.1, 1, 10, etc.) is set, the unit value may be added to or subtracted from an angle of each joint.

For example, when the joint with the third ID is selected by a left mouse click and an angle of 20 degrees is input through the angle change interface 204, the angle of the joint with the third ID may be +20 degrees. Also, when the joint with the fourth ID is selected by a right mouse click and an angle of 30 degrees is input through the angle change interface 204, an angle of the joint with the fourth ID may be −30 degrees. In this case, when the unit value is set as one degree through the difference adjustment tap and a button for a subtraction selection (a CW button) is selected once, the angle of the joint with the third ID may be changed to 19 degrees by subtracting one degree from 20 degrees, and the angle of the joint with fourth ID may be changed to −29 degrees by adding one degree to −30 degrees.

According to an embodiment of the present invention, after "make a new joint group" button included in the joint group menu 203 is selected and then "both-arm group" is input as a joint group name, a confirmation button may be selected.

Subsequently, the joints with the first, third, and fifth IDs are selected by left mouse clicks through a joint group editing menu included in the joint group menu 203, and the joints with the second, fourth, and sixth IDs may be selected by right mouse clicks. '×1.0' may be input as a weight. In this case, weights of the joints with the first, third, and fifth IDs may be set as '×1.0' because a positive direction is applied when a left mouse click is selected, and weights of the joints with the second, fourth, and sixth IDs may be set as '×−1.0' because a negative direction is applied when a right mouse click is selected.

When a confirmation button is selected after the weights are input, "both-arm group" may be added to a joint group list window included in the joint group menu 203. When "both-arm group" is selected, the robot motion viewer 120 may display the first, third, and fifth IDs using a color (e.g., blue) different from those of the other IDs and display the second, fourth, and sixth IDs using another color (e.g., red) different from those of the other IDs, among the IDs displayed together with the 3D image of the robot.

Subsequently, when the angle is changed through the difference adjustment tap included in the angle change interface 204, the weights of the joints with the first, third, and fifth IDs corresponding to the left arm and the weights of the joints with the second, fourth, and sixth IDs corresponding to the right arm may be set to have the same absolute value and opposite signs. Thus, the angles may be changed, causing a posture in which the arms are symmetrical.

That is, it is possible to set directional properties and weights of the plurality of joints together through the joint group menu 203, and it is also possible to change angles of the plurality of joints through the difference adjustment tap according to the directional properties and weights.

When the weights are set to be different by selecting only some from the joint group that is set through the joint group menu 203, for example, when only the joints with the fifth and sixth IDs are selected from "both-arm group" to set the weighs as '×2.0,' the angles of the joints with the fifth and sixth IDs that are changed through the difference adjustment tap may be different from the angles of the joints with the first, second, third, and fourth IDs. That is, the weights may be set for some or all in the joint group and may be applied when the angles are changed through the difference adjustment tap.

The angle change interface 204 may further include a horizontal symmetry button, a vertical symmetry button, and an origin symmetry button for changing an angle of a joint to its symmetrical value. For example, when the same value is input as the angles of the joints with the third and fifth IDs corresponding to the right arm and the angles of the joints with the fourth and sixth IDs corresponding to the left arm, a posture of the right arm and a posture of the left arm may become the same without distinguishing between left and right (e.g., an unnatural posture in which the left arm is folded outward corresponding to a posture in which the right arm is folded inward). In this case, when the horizontal symmetry button is selected after the joints with the fourth and sixth IDs corresponding to the left arm are selected, the angles may be changed, causing a natural posture in which the right arm and the left arm are symmetrical.

When the angles of the joints between the components are changed as described above, the robot motion viewer 120 may display a first stationary posture of the robot in which both of the arms are raised as shown in FIG. 4A and may display a second stationary posture of the robot in which both of the arms are lowered as shown in FIG. 4B.

The key frame menu 205 is a menu for inserting or deleting a stationary posture of the robot edited by a user. When an insertion menu is selected from the key frame menu 205, the storage may store the stationary posture of the robot edited by the user in units of key frames according to a time positioned through the timeline interface 201. When a deletion menu is selected from the key frame menu 205, the storage may delete the stationary posture of the robot stored in units of key frames.

That is, the storage 110 may store the first stationary posture of the robot in which both of the arms are raised in units of key frames of a time point of 0.2 sec positioned through the timeline interface 201, as shown in FIG. 4A, and may store the second stationary posture of the robot in which both of the arms are lowered in units of key frames of a time point of 0.4 sec positioned through the timeline interface 201, as shown in FIG. 4B. In this case, by a user input, an angle between components constituting the robot that is in the first stationary posture or the second stationary posture may be changed through the angle change interface 204, and also a time point positioned through the timeline interface 201 may be changed. Here, each of the time points of 0.2 sec and 0.4 sec denote time elapsed from a play start time (0 sec) on the assumption that a robot motion starts to be played at 0 sec.

Figure 5:
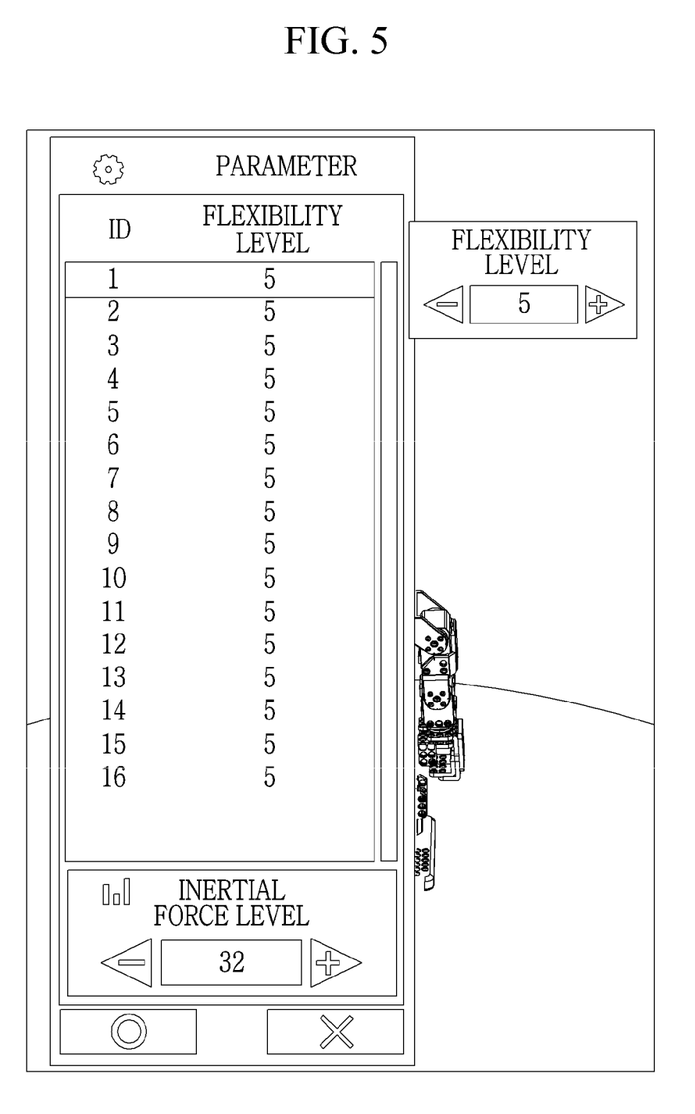
FIG. 5 is a diagram showing a screen window for displaying a motion unit parameter interface according to an embodiment of the present invention.

The robot motion viewer 120 may display, on the screen window, a motion unit parameter interface for editing inertial force of the robot and flexibility of at least one of the joints between the plurality of components constituting the robot. That is, as shown in FIG. 5, the robot motion viewer 120 may display, on the screen window, a motion unit parameter interface for editing a step for the inertial force of the robot and a step for the flexibility for each of the joints between the components.

The play menu 206 is a menu for connecting the first stationary posture and the second stationary posture that are stored in the storage 110 according to an interpolation technique and displaying a motion unit of the robot as a video. When the play menu 206 is selected, the robot motion viewer 120 may connect a posture in which the robot stands upright with the arms outstretched at 0 sec (start point), a first stationary posture of the robot in which both of the arms are raised after 0.2 sec from the start point, and a second stationary posture of the robot in which both of the arms are lowered after 0.4 sec from the start point to generate a motion of the robot in which the robot moves naturally over time and may display the motion of the robot on the screen window as a video. In this case, the robot motion viewer 120 may further apply the above-described motion unit parameter to generate the motion unit of the robot.

After displaying the motion unit of the robot on the screen window as a video, the robot motion viewer 120 may change the motion unit to a preregistered stable ready posture of the robot and display the preregistered stable ready posture on the screen window at the end.

When an emulator function is activated, the robot motion viewer 120 may display the motion unit of the robot on the screen window as a video, similarly to an actual robot. For example, at least one of the two feet of the actual robot should be on the ground. Accordingly, in consideration of this, the robot motion viewer 120 may display the motion unit of the robot on the screen window as a video.

When a specific time point is selected through the timeline interface 201, the robot motion viewer 120 may display a stationary posture corresponding to the specific time point for the motion unit of the robot on the screen window. For example, when a time point of 0.3 sec is selected through the timeline interface 201, the robot motion viewer 120 may display a stationary posture of the robot in which both of the arms are raised at 45 degrees corresponding to the time point after 0.3 sec during a process of changing the first stationary posture corresponding to a time point after 0.2 sec from the start to the second stationary posture corresponding to a time point after 0.4 sec.

The teaching menu 207 is a menu for synchronizing a stationary posture of the robot displayed on the screen window with an actual robot model connected with the robot motion editing and playing device 100. Through the teaching menu 207, a stationary posture of the robot edited by a user may be applied to an actual robot model to acquire posture information of the actual robot model. Thus, the stationary posture of the robot displayed on the screen window may be changed to a posture of the actual robot model. In this case, when there is a difference between the posture of the actual robot model and the posture of the robot displayed on the screen window, the robot motion editing and playing device 100 may perform synchronization by compensating for the difference. For example, when a posture of one leg of the actual robot model is deviated due to abrasion, damage, etc., the robot motion editing and playing device 100 may correct the deviation to synchronize the robot displayed on the screen window with the actual robot model.

The torque menu 208 is a menu for controlling the synchronized actual robot model. When torque deactivation is selected through the torque menu 208, the joint of the actual robot model may be weakened and thus randomly changed. On the other hand, when torque activation is selected, the joint of the actual robot model is strengthened to fix the joint and maintain an angle of the joint.

For example, when the torque deactivation is performed on a joint of a shoulder part of the actual robot model, the posture is changed to a posture in which arms are raised by changing the joint of the shoulder part. And then, when the torque activation is performed on the joint of the shoulder part of the actual robot model, the joint of the shoulder part may be fixed so that the posture in which the arms are raised is not changed. In this case, the robot motion editing and playing device 100 may acquire information regarding a posture of the robot including an angle of the fixed joint.

As described above, according to an embodiment of the present invention, since a timeline-based animation editing technology is used to edit a motion unit of a robot, it is possible to provide an intuitive motion unit editing environment, compared to the conventional way, thereby allowing even non-specialists to intuitively edit the motion unit of the robot and thus improving user convenience.

Also, according to an embodiment of the present invention, when the motion unit of the robot is edited, a result of the editing may be checked in advance through the motion unit of the robot displayed on the screen window, without directly driving the actual robot model.

Figure 6:
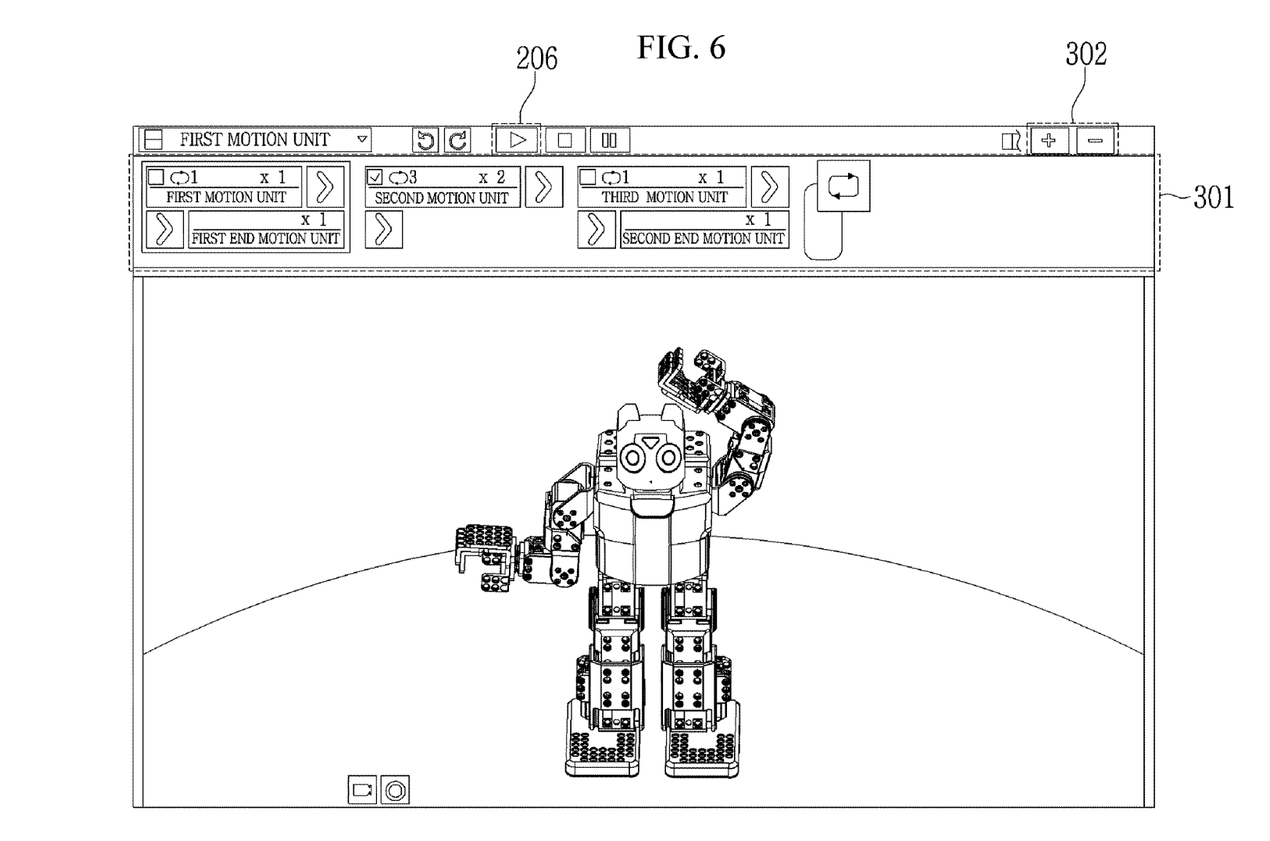
FIG. 6 is a diagram showing a screen window for editing a motion according to an embodiment of the present invention.

FIG. 6 is a diagram showing a screen window for editing a motion according to an embodiment of the present invention.

First, the storage 110 may store a motion unit of the robot generated through a motion unit editing program. In this case, the storage 110 may store many motion units of the robot as long as a physical space of a memory is not exceeded or may store only a motion unit selected by a user from among the motion units of the robot.

The robot motion viewer 120 may execute a motion editing program to load the motion unit of the robot that is generated through a motion unit editing program and stored in the storage 110.

Referring to FIG. 6, the robot motion viewer 120 may display a flowchart interface 301, a link menu 302, and a play menu 206 on the screen window. The flowchart interface 301 is a user interface for sequentially positioning motion units of the robot and generating a continuous motion of the robot. The motion units of the robot for which motion parameters are set may be positioned through the flowchart interface 301.

Figure 7:
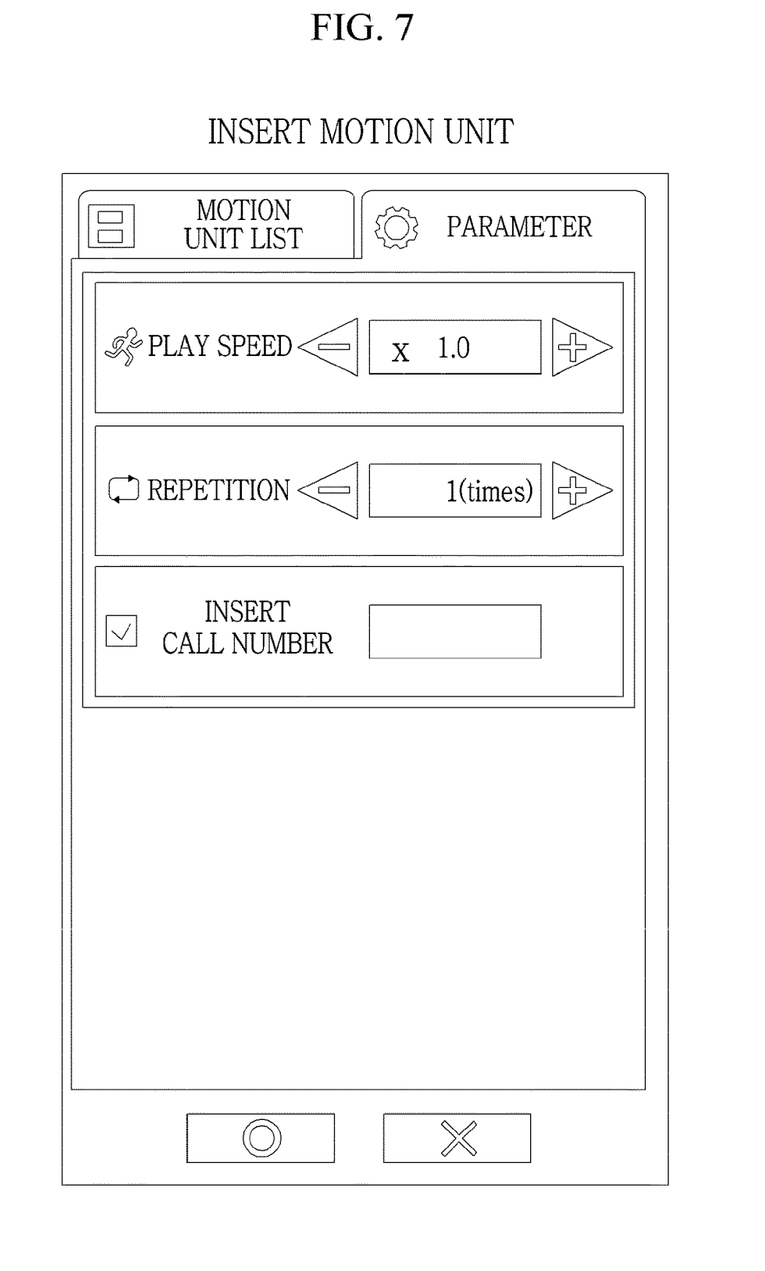
FIG. 7 is a diagram showing a screen window for displaying a motion parameter interface according to an embodiment of the present invention.

In this case, the motion parameters may be input through a motion parameter interface. As shown in FIG. 7, the robot motion viewer 120 may display the motion parameter interface on the screen window. The motion parameter interface is a user interface for setting motion parameters including a repetition number, a play speed, and a call possibility of the motion unit of the robot. The motion parameters may be set for each motion unit.

After the motion units of the robot are positioned in sequence through the flowchart interface 301, the sequence of the motion units may be changed through a drag and drop method. The robot motion viewer 120 may newly connect the motion units according to the changed positions of the motion units of the robot to generate motions.

The link menu 302 is a menu for inserting or deleting a motion unit of the robot for which a motion parameter is set. When an insertion menu is selected from the link menu 302, the robot motion viewer 120 may insert the selected motion unit of the robot into the motion. When a deletion menu is selected from the link menu 302, the robot motion viewer 120 may delete the selected motion unit of the robot from the motion.

As described above, the play menu 206 is a menu for displaying a motion of the robot as a video. When the play menu 206 is selected, the robot motion viewer 120 may generate a motion, which is a continuous operation for the motion unit of the robot, using a position of a motion unit of the robot, a motion parameter, and an end motion unit that are input through the flowchart interface 301 and may display the motion on the screen window as a video.

Referring to the flowchart interface 301 shown in FIG. 6, a first motion unit, a second motion unit, and a third motion unit are sequentially positioned. The first motion unit has a play speed of ×1, a repetition number of 1, and a call possibility being automatically checked as call possible because the first motion unit has the first order. The second motion unit has a play speed of ×2, a repetition number of 2, and a call possibility being checked as call possible. The third motion unit has a play speed of ×1, a repetition number of 1, and a call possibility being checked as call impossible.

The robot motion viewer 120 may connect the first motion unit, the second motion unit, and the third motion unit in sequence to generate a motion.

The robot motion viewer 120 may display the generated motion on the screen window as a video. In this case, a play speed and a repetition number may be applied for each motion unit by using motion parameters. That is, the robot motion viewer 120 may connect a video in which the first motion unit is repeated once at a play speed of ×1, the second motion unit is repeated three times at a play speed of ×2, and the third motion unit is repeated once at a play speed of ×1 and may display the video on the screen window.

According to the call possibility included in the motion parameters, the robot motion viewer 120 may display the video on the screen window, starting from the first motion unit or the second motion unit being checked as call possible. In this case, when the video is displayed starting from the second motion unit, the first motion unit may not be displayed.

Referring to the flowchart interface 301, a first end motion unit is connected to the first motion unit, an end motion unit is not connected to the second motion unit, and a second end motion unit is connected to the third motion unit. Here, each of the first end motion unit and the second end motion unit may be a motion unit in which a center of mass displayed at the end is in a stable state.

For example, when an end command is input while the first motion unit is being displayed as a video, the robot motion viewer 120 may display the first end motion unit connected with the first motion unit.

Also, when an end command is input while the second motion unit is displayed as a video, the robot motion viewer 120 may display only the second motion unit and then end playing of the motion.

That is, when an end command is input while a motion unit to which an end motion unit is not connected is displayed as a video, the robot motion viewer 120 may display only the corresponding motion unit and then end playing of the motion, like a process performed according to a compulsory end command.

The motion editing described with reference to FIG. 6 may be performed by the motion editing program. The motion unit editing described with reference to FIGS. 4A and 4B may be performed by the motion unit editing program.

The storage 110 may store a motion projection file including a motion unit generated by the motion unit editing program, a motion generated by the motion editing program, and a motion group including a plurality of motions.

Since a memory of the robot is limited, a plurality of motions cannot be stored in the memory of the robot. According to the purpose, the motion project file may be divided into several files. When there are several motion project files, a method of selecting and downloading a corresponding motion projection file may need a task of storing the files in a directory or a compression file and mutually copying motions needed between the files.

However, a method of generating a motion by referencing a motion unit in one motion project file by a library method, grouping a plurality of motions to generate a motion group according to the purpose, selecting the motion group rather than selecting of the motion project file, and downloading a file corresponding to the motion group may not need the take of storing the files in a directory or a compression file and mutually copying motions needed between the files.

Thus, by setting a function of grouping motions according to the purpose through the motion group rather than the motion project file, it is possible to reuse the motion project file that had been used without needing to generate a new motion project file, thus facilitating maintenance of the motion project file and also increasing a reuse rate of the file.

The above description is merely illustrative, and it will be understood by those skilled in the art that various changes in form and details may be made therein without departing from the spirit and scope of the invention as defined by the appended claims.

The above embodiments are accordingly to be regarded as illustrative rather than restrictive. For example, while a single element may be distributed and then carried out, the distributed elements may be carried out in a combination thereof.

Therefore, the scope of the invention is defined by the appended claims, and a variety of embodiments within the scope should be construed as being included in the present invention.

DESCRIPTION OF SYMBOLS

100: robot motion editing and playing device
110: storage
120: robot motion viewer
201: timeline interface
202: joint list
203: joint group menu
204: angle change interface
205: key frame menu
206: play menu
207: teaching menu
208: torque menu
301: flowchart interface
302: link menu

The invention claimed is:

1. A device for editing and playing a robot motion, the device comprising:
a storage configured to store a 3D image file of a robot and further store time-dependent stationary postures of the robot edited by a user input in units of key frames; and
a robot motion viewer configured to display, as a video, motion units of the robot obtained by connecting the stationary postures stored in units of key frames using an interpolation technique,
wherein the robot motion viewer is configured to further display a flowchart interface for registering the motion units in sequence, and display, as the video, motions obtained by connecting the motion units in an order in which the motion units are input through the flowchart interface,
wherein the storage is configured to store an end motion unit that has a center of mass connected with each of the motion units input through the flowchart interface in a stable state,
wherein the robot motion viewer is configured to successively display the end motion unit when an end command is input while the video of the motion is being displayed.

2. The device of claim 1, wherein:
the storage further stores an identity (ID) allocated to each of joints between a plurality of components constituting the robot; and
the robot motion viewer displays the ID allocated to the joint in addition to a 3D image of the robot to edit each of the stationary postures of the robot.

3. The device of claim 1, wherein:
when at least one joint is selected from among joints between a plurality of components constituting the robot, the robot motion viewer further displays an angle change interface for editing an angle of the selected joint; and
the storage stores a stationary posture of the robot including a component having a joint edited according to an angle input through the angle change interface.

4. The device of claim 1, wherein:
the robot motion viewer further displays a timeline interface for registering the time-dependent stationary postures of the robot; and
the storage stores the stationary posture of the robot in units of key frames according to a time input through the timeline interface.

5. The device of claim 1, wherein the robot motion viewer further displays a motion unit parameter interface for editing inertial force of the robot and flexibility of at least one of joints between a plurality of components constituting the robot and displays the motion units as the video using a motion unit parameter input through the motion unit parameter interface.

6. The device of claim 1, wherein the robot motion viewer further displays a motion unit parameter interface for editing a play speed, a repetition number, and a call possibility of each of the motion units, and the robot motion viewer displays the motion as the video using a motion parameter input through the motion parameter interface.

7. The device of claim 1, wherein the 3D image file of the robot includes at least one of a file that is provided, by default, by a motion unit editing program executed by the robot motion viewer and a file that is edited and stored through a robot assembling program by a user's manipulation.

8. The device of claim 1, wherein the storage stores the motion units obtained by connecting the stationary postures by referencing the stationary postures by a library method and stores the motion obtained by connecting the motion units by referencing the motion units by a library method.

9. The device of claim 1, wherein the storage stores, in one motion project file, motion groups obtained by grouping motions obtained by connecting the motion units according to purpose.

10. A method of editing and playing a robot motion, the method comprising:
storing a 3D image file of a robot and further storing time-dependent stationary postures of the robot edited by a user input in units of key frames; and
displaying, as a video, motion units of the robot obtained by connecting the stationary postures stored in units of key frames using an interpolation technique,
wherein the displaying step further displays a flowchart interface for registering the motion units in sequence, and displays, as the video, motions obtained by connecting the motion units in an order in which the motion units are input through the flowchart interface,
wherein the storing step further stores an end motion unit that has a center of mass connected with each of the motion units input through the flowchart interface in a stable state,
wherein the displaying step successively displays the end motion unit when an end command is input while the video of the motion is being displayed.

11. A non-transitory computer-readable recording medium having a computer program recorded thereon for performing the method of claim 10.

* * * * *